United States Patent
Gao et al.

(10) Patent No.: US 8,139,669 B2
(45) Date of Patent: Mar. 20, 2012

(54) SPACE DOMAIN FILTER DETECTING METHOD IN A MULTI-ANTENNA WIRELESS COMMUNICATION SYSTEM

(75) Inventors: Xiqi Gao, Nanjing (CN); Xiaohu You, Nanjing (CN); Wenjin Wang, Nanjing (CN); Dong-Seung Kwon, Daejeon (KR); Seung-Jun Lee, Daejeon (KR)

(73) Assignees: Southeast University, Nanjing (CN); Electronics and Telecommunications Research Institute, Daejeon (KR)

( * ) Notice: Subject to any disclaimer, the term of this patent is extended or adjusted under 35 U.S.C. 154(b) by 681 days.

(21) Appl. No.: 12/225,892

(22) PCT Filed: Jan. 24, 2007

(86) PCT No.: PCT/CN2007/000269
§ 371 (c)(1),
(2), (4) Date: Jan. 28, 2009

(87) PCT Pub. No.: WO2007/112634
PCT Pub. Date: Oct. 11, 2007

(65) Prior Publication Data
US 2009/0310725 A1    Dec. 17, 2009

(30) Foreign Application Priority Data
Mar. 31, 2006    (CN) .......................... 2006 1 0066284

(51) Int. Cl.
*H04B 7/02* (2006.01)
(52) U.S. Cl. ........ 375/267; 375/260; 375/262; 375/265; 375/325; 375/341; 375/340; 375/346
(58) Field of Classification Search .................. 375/267, 375/262, 265, 260, 325, 341, 340, 346
See application file for complete search history.

(56) References Cited

U.S. PATENT DOCUMENTS

| 5,425,059 | A | 6/1995 | Tsujimoto |
| 6,707,864 | B2 | 3/2004 | Kim |
| 2002/0136188 | A1 | 9/2002 | Kim |
| 2002/0141518 | A1* | 10/2002 | Piirainen ....................... 375/346 |
| 2003/0076908 | A1* | 4/2003 | Huang et al. .................. 375/350 |
| 2004/0170229 | A1 | 9/2004 | Kim |

FOREIGN PATENT DOCUMENTS

| CN | 1496612 A | 5/2004 |
| CN | 1719760 A | 1/2006 |
| WO | WO 02/060082 A2 | 8/2002 |

OTHER PUBLICATIONS

International Search Report, dated May 17, 2007, corresponding to PCT/CN2007/000269.

* cited by examiner

*Primary Examiner* — Kabir A Timory
(74) *Attorney, Agent, or Firm* — Christie, Parker & Hale, LLP

(57) ABSTRACT

A space domain filter detecting method in a multi-antennas wireless communication system, which processes time and space domain interference differently. The space domain filter detecting method comprises the following steps: firstly, the received signals are matched-combined in time domain and space domain; secondly, using the combined signals as an observation value, the space domain filtering is performed; thirdly, an estimated value is subtracted from the filtered signals, and the result is taken as a detection output, which is sent to a determiner in a non-error control coding system to get a hard determination output or is sent to a determiner in an error control coding system to get a soft determination output that is finally sent to a coder. The method promotes the transmission rate and the anti-interference ability and advances the spectrum efficiency.

4 Claims, 1 Drawing Sheet

SPACE DOMAIN FILTER DETECTING METHOD IN A MULTI-ANTENNA WIRELESS COMMUNICATION SYSTEM

CROSS-REFERENCE TO RELATED APPLICATION

This application is a National Phase Patent Application and claims the priority of International Application Number PCT/CN2007/000269, filed on Jan. 24, 2007, which claims priority of Chinese Patent Application Number 200610066284.X, filed on Mar. 31, 2006.

FIELD OF THE INVENTION

The present invention relates to a receiving technique in a multi-antenna wireless communication system, and pertains to the technical field of high speed wireless transmission.

BACKGROUND OF THE INVENTION

Employing multi-antenna transmitting and multi-antenna receiving technique in a wireless communication system can improve transmitting capacity of the communication system by many times theoretically. However, at the receiving end in a multi-antenna wireless communication system, signal interference in space domain (i.e., between antennas) exists. When signal transmission is carried out on a single carrier of wide band or multiple carriers of wide sub-bands, the wireless channel of each carrier becomes a frequency selective channel, i.e., inter-symbol interference in different times exists. Therefore, in a frequency selective channel environment, signal interference between different antennas, signal interference in different times, and Additive White Gaussian Noise (AWGN) exist at the receiving end of the multi-antenna system. At the receiving end, it is necessary to suppress interference signals in space domain and time domain dimensions and additive noise, obtain estimation result of the transmitted signals, and provide hard-decision output in an encoding system without error control; or, in an error control encoding system utilizing soft-decision decoding technique, the soft information must be obtained by means of soft demodulation and then sent to a decoder.

In an environment with inter-symbol interference between antennae and inter-symbol interference in different times, the detecting methods are mainly categorized into two categories: one category is based on maximum a posteriori (MAP) and it's simplified algorithms, which are highly complex; the complexity of the optimal MAP algorithm increase exponentially with the number of transmitting antennae, the number of bits carried in each symbol and the channel memory length; when the number of antennae is large or high order modulation is used, it is difficult to apply such detection methods in actual systems. The other category involves detectors that utilize linear filtering and interference cancellation techniques, which are less complex. Minimum Mean Square Error (MMSE) criterion and Zero-Forcing (ZF) criterion are two commonly used criteria, whose complexity increases in cubic power relationship with the product of channel memory length and number of transmitting antennae. However, the complexity in implementation of such detecting method is still too high when the number of antennae is large or the channel memory length is long. In contrast, the complexity of MF-based interference cancellation detectors increases linearly as product of channel retention length and number of transmitting antennae increases, and therefore is relatively low; however, if the antennae have correlation to some degree between each other, such detectors have poor performance, and even can't work normally in some environments. Therefore, it is of great significance to seek for a high performance detector with lower complexity in implementation in practice. In communication systems, an error control encoding technique is usually used at the transmitting end to improve transmission performance and enhance resistance to fading, noise, and interference. Turbo Code, Low Density Parity Check (LDPC) code, etc., are error control encoding methods with high error correction capability. At the receiving end, utilizing an iterative detection decoding receiver in which the detector works with the decoder in an iterative mode can significantly improve performance, when compared to a traditional receiver in which the detector works with the decoder in a cascade mode. However, an iterative detection decoding receiver requires that the detector must take soft input and provide soft output, i.e., the detector must be able to sue the feedback from the decoder as a priori information and provide soft-decision information to the decoder. It is an important task to seek for a soft-input and soft-output detector that has high performance but low complexity for multi-antenna wireless communication systems in a frequency selective channel environment, in order to support wide application of multi-antenna wireless communication systems.

SUMMARY OF THE INVENTION

Technical problem: the object of the present invention is to provide an space domain filter detecting method in a multi-antenna wireless communication system, which has performance comparable to a MMSE detector but lower order of complexity in implementation, and can not only carry out hard-decision based detection for encoding systems without error control but also meet the requirement of iterative detection decoding receiver for soft input and soft output of the detector.

Technical scheme: firstly, baseband receiving signals on a plurality of antennae are match-combined in space and time dimensions. Secondly, after the combination, the signals from all antennae in each time are filtered in space domain, and then the residual interference signals in the signals after space domain filtering are cancelled, so as to obtain the estimation of transmitted signals. In addition, the variance of estimation error is calculated according to channel parameters, filter coefficient, and statistical characteristics of interference signals, to calculate soft information of transmitted bits.

The space domain filter detecting method in a multi-antenna wireless communication system in the present invention treats interference in time domain and interference in space domain differently, i.e., the method performs MF-based interference cancellation for the interference signals on all antennae in other moments, but performs filtering for the interference signals on other antennae in current time on the basis of specific criteria, as follows:

Step 1: performing matched combination for the received signals in time domain and space domain;

Step 2: taking the combined signals as observation values of the signals to be detected, and performing filtering in space domain on the basis of corresponding criteria;

Step 3: Removing the estimated values of interference signals from the filtered signals and then taking the result as detection output, and sending the output to a decider unit in an encoding system without error control to obtain hard-decision output of symbols, or sending the output to a soft demodulator in an error control encoding system to obtain soft information of the transmitted bits, and then sending the hard-decision output or soft information to a decoder.

During the space domain filtering process, the filter coefficient can be calculated on the basis of MMSE criterion, ZF criterion, or any other criterion. The filter coefficient is calculated according to the expectation and variance of the interference signals. The expectation and variance of interference signals are obtained from the result of the last detection, i.e., the detector performs self-iteration; the statistical information of interference signals is provided by the output of the decoder, i.e., the detector works with the decoder in an iterative mode.

The technical scheme mainly comprises five modules: space-time combination module, space domain filter module, interference cancellation module, expectation and variance calculation module, and soft demodulator module. Hereunder the five modules will be described in detail, and the workflow of the detector will be discussed finally.

1. Space-Time Combination Module

The space-time combination module performs matched combination for the received signals in space and time dimensions according to the received signals and channel parameters, to obtain combined signals and parameters of equivalent channels after combination. Suppose the complex baseband signal on receiving antenna m in time k is $r_{m,k}$, and the channel coefficient of path l from transmitting antenna n to receiving antenna m is $h_{m,n,l}$, the two-dimensional space-time combination result $x_{n,k}$ can be calculated with the following expression:

$$x_{n,k} = \sum_{m=1}^{M} \sum_{l=0}^{L-1} h_{n,m,l}^{*} r_{m,k+l}$$

Or it can be denoted in the following vector expression:

$$x_k = H^H r_k \quad [1]$$

$$x_k = [x_{1,k} \ x_{2,k} \ \ldots \ x_{N,k}]^T,$$

$$r_k = [r_{1,k} \ r_{2,k} \ \ldots \ r_{M-1,k+L-1} \ r_{M,k+L-1}]^T,$$

and $$H = \begin{bmatrix} H_0 \\ H_1 \\ \vdots \\ H_{L-1} \end{bmatrix}$$

and $$H_l = \begin{bmatrix} h_{1,1,l} & h_{1,2,l} & \ldots & h_{1,N,l} \\ \vdots & \vdots & \ddots & \vdots \\ h_{M,1,l} & h_{M,2,l} & \ldots & h_{M,N,l} \end{bmatrix}$$

$(\cdot)^H$ represents conjugate transposition of the matrix.

In addition, the matrix of coefficients after matched combination is calculated as follows:

$$G = [G_{-L+1} \ \ldots \ G_0 \ \ldots \ G_{L-1}] \quad [2]$$

$$= H^H \begin{bmatrix} H_{L-1} & \ldots & H_0 & & \\ & \ddots & \vdots & \ddots & \\ & & H_{L-1} & \ldots & H_0 \end{bmatrix}$$

2. Space Domain Filter Module

Space domain filtering is to perform Wiener filtering for the combined signals $x_k$, in order to suppress interference signals and noises in MMSE concept. In the technical scheme of the present invention, the filter coefficient is shared in each sub-block. In practical application, a sub-block can be comprehended as a time period in which the channel coefficient is presumed as constant. The output of filtering is:

$$y_k = C x_k \quad [3]$$

Wherein, C is calculated with the following expression:

$$C = G_0^H (D + G_0 \sigma_z^2)^{-1} \quad [4]$$

Wherein, $\sigma_z^2$ is the variance of noise, $$D = \sum_{l=-L+1}^{L-1} G_l \bar{V} G_l^H, \ \bar{V} = \text{diag}\{\bar{\sigma}_{s,1}^2, \bar{\sigma}_{s,2}^2, \ldots, \bar{\sigma}_{s,N}^2\}.$$

$\bar{\sigma}_{s,n}^2$ represents the average of variances of signals on antenna n. When the filter outputs, the coefficients of signal term and interference term must be calculated.

3. Interference Cancellation Module

After space domain filtering, residual interference signals still exist. The estimation of interference signals can be reconstructed from the last detection result or the soft information feedback from the decoder. The expectation of interference signals can be utilizes as the estimated value to attain optical solution in MMSE concept; therefore, in the technical scheme provided in the present invention, the expectation of interference signals will be used as the estimated value of the interference signals. To calculate soft information of symbols or bits, not only the estimated value of signals after interference cancellation but also the equivalent fading coefficient and the variance of residual interference noise are required. Therefore, in the interference cancellation part, there are two tasks: calculate the signals after interference cancellation, and calculate the variance of residual interference noise.

It is seen from above steps:

$$y_{n,k} = \sum_{n'=1}^{N} \sum_{l=-L+1}^{L-1} \beta_{n,lN+n'} s_{n',k+l} + z'_{n,k}$$

Wherein, $\beta_{n,l}$ is the element of CG in row n and column l+N(L−1), and $z'_{n,k}$ is noise. Then, the estimated value of signals after interference cancellation is:

$$\tilde{y}_{n,k} = y_{n,k} - \sum_{n'=1}^{N} \sum_{l=-L+1}^{L-1} \beta_{n,lN+n'} \bar{s}_{n',k+l} + \beta_{n,n} \bar{s}_{n,k} \quad [5]$$

The variance of residual interference noise is:

$$v_{n,k} = \sum_{n'=1}^{N} \sum_{l=-L+1}^{L-1} |\beta_{n,lN+n'}|^2 \sigma_{s,n',k+l}^2 - |\beta_{n,n}|^2 \sigma_{s,n,k}^2 + \beta_{n,n} \sigma_z^2 \quad [6]$$

4. Expectation and Variance Calculation Module

In the space domain filtering part and interference cancellation part, statistical values of the signals, i.e., expectation and variance, must be calculated, in order to calculate the coefficient of space domain filter, interference cancellation, and variance of residual interference noise. The statistical values of the signals can be calculated according to the last detection result $\tilde{y}_{n,k}$, $\beta_{n,n}$, and $v_{n,k}$, or the likelihood ratios of bits provided by the decoder. Hereunder the two methods will be discussed.

4.A. Calculating Statistical Values of the Signals According to the Last Detection Result The expectation of the signals can be calculated with the following expression, according to the last detection result:

$$\bar{s}_{n,k} = \sum_{\alpha} \alpha P(s_{n,k} = \alpha \mid \tilde{y}_{n,k}, \beta_{n,n}, v_{n,k}) \quad [7]$$

Wherein, $\alpha$ is a symbol in the transmitted symbol set, and $$P(s_{n,k} = \alpha \mid \tilde{y}_{n,k}, \beta_{n,n} v_{n,k}) = \frac{\exp\left(-\frac{(\tilde{y}_{n,k} - \beta_{n,n}\alpha)^2}{v_{n,k}}\right)}{\sum_{\alpha'} \exp\left(-\frac{(\tilde{y}_{n,k} - \beta_{n,n}\alpha')^2}{v_{n,k}}\right)} \quad [8]$$

The variance of the signals can be calculated with the following expression:

$$\sigma_{s,n,k}^2 = \sum_{\alpha} |\alpha|^2 P(s_{n,k} = \alpha \mid \tilde{y}_{n,k}) - \bar{s}_{n,k}^2 \quad [9]$$

4.B. Calculating Statistical Values of the Signals According to the Soft Information Feedback from the Decoder In an iterative detection decoding receiver, the decoder can provide the likelihood ratios of bits to the detector, and the statistical values of the signals required by the detector can be calculated with the likelihood ratios provided by the decoder. In such a case, the expectation and variance of the signals can still be calculated with expression [7] and [9], with the probability term $P(s_{n,k}=\alpha|\tilde{y}_{n,k},\beta_{n,n}, v_{n,k})$ replaced by $P(s_{n,k}=\alpha)$, which is calculated with the following expression:

$$P(s_{n,k} = \alpha) = \prod_{\alpha:b_i} \frac{\exp(-b_i L(b_i)/2)}{\exp(-L(b_i)/2) + \exp(L(b_i)/2)} \quad [10]$$

$b_i$ represents the value of the $i^{th}$ bit corresponding to symbol $\alpha$. $L(b_i)$ represents the likelihood ratio of the bit provided by the decoder.

5. Soft Demodulator Module

Most high-performance decoding algorithms require likelihood ratios provided by a detector as input. Therefore, the result obtained from the interference cancellation part must be converted to likelihood ratios of bits, with the constraints on baseband mapping, and then provided to the decoder. That process is usually referred to as soft demodulation. The likelihood ratios of bits can be calculated with the following expression:

$$L_D(b_i) = \max_{\alpha:b_i=+1} * \left\{ -\frac{(\tilde{y}_{n,k} - \beta_{n,n}\alpha)^2}{v_{n,k}} + \sum_{b_j \in \alpha} b_j L(b_j) \right\} - \quad [11]$$

$$\max_{\alpha:b_i=-1} * \left\{ -\frac{(\tilde{y}_{n,k} - \beta_{n,n}\alpha)^2}{v_{n,k}} + \sum_{b_j \in \alpha} b_j L(b_j) \right\}$$

6. Workflow of the Detector

In an encoding system without error control, the detector only requires the hard decision of symbols or bits, which is to say, no soft information provided by the decoder exists, and it is unnecessary to calculate soft information of the bits. However, in the iterative detection decoding receiver in the encoding system, the detector not only uses the soft information provided by the decoder but also calculates new soft information and provides the soft information to the decoder. Hereunder the workflow of the detector will be discussed in the two cases:

6.A. Detection Process in an without Encoding System

For a sub-block, i.e., a time period in which the channel coefficient is presumed as constant, suppose the length of the sub-block is K, the detector will work through the following process:

6.A.1) Carrying out space-time combination with expressions [1] and [2].

6.A.2) Initializing the expectation and variance of the signals, in the normalized case, the average value is 0, and the variance is 1).

6.A.3) Iterating from the first time to time $T_1$.

6.A.3.1) Carrying out space domain filtering with expressions [3] and [4].

6.A.3.2) For each signal on each antenna, carrying out interference cancellation with expressions [5] and [6], and reconstructing the expectation and variance of the signal with expressions [7] and [8].

6.A.4) Carrying out hard-decision output from the obtained result $\tilde{y}_{n,k}$.

6.B. Detection Process in Iterative Detection Decoding Receiver

For a sub-block, i.e., a time period in which the channel coefficient is presumed as constant, suppose the length of the sub-block is K, the detector will work through the following process:

6.B.1) Carrying out space-time combination with expressions [1] and [2].

6.B.2) Initialize the expectation and variance of the signals, in the normalized case, the average value is 0, and the variance is 1.

6.B.3) Cycling from the first time to time $T_1$ (initial detection).

6.B.3.1) Carrying out space domain filtering with expressions [3] and [4].

6.B.3.2) For each signal on each antenna, carrying out interference cancellation with expressions [5] and [6], and reconstructing the expectation and variance of the signal with expressions [7] and [8].

6.B.4) Calculating soft information of each bit with expression [11].

6.B.5) Carrying out general soft I/O decoding. If NOT:

6.B.6) Cycling from the first time to time $T_2$ (subsequent detection).

6.B.6.1) Calculating expectation and variance of the signal with expressions [7], [9], and [11].

6.B.6.2) Calculate space domain filter coefficient with expression 4 or set the space domain filter matrix as C=I; carry out space domain filtering with expression [3].

6.B.6.3) Carrying out interference cancellation for each signal on each antenna with expressions [5] and [6], respectively.
6.B.6.4) Calculating soft information of each bit with expression [11].
6.B.6.5) Carrying out general soft I/O decoding.
6.B.7) Outputting the decoding result.

Functional effects: The space domain filter detecting method in a multi-antenna wireless communication system provided in the present invention has complexity much lower than that of MMSE-based detectors and slightly higher than that of MF interference cancellation based detectors, but has performance equivalent to MMSE-based detectors and superior to MF interference cancellation based detectors, in environments with large number of antennae and channel paths, especially in the cases that the antennas have correlation to each other.

DETAILED DESCRIPTION OF THE EMBODIMENTS

Figure 1:
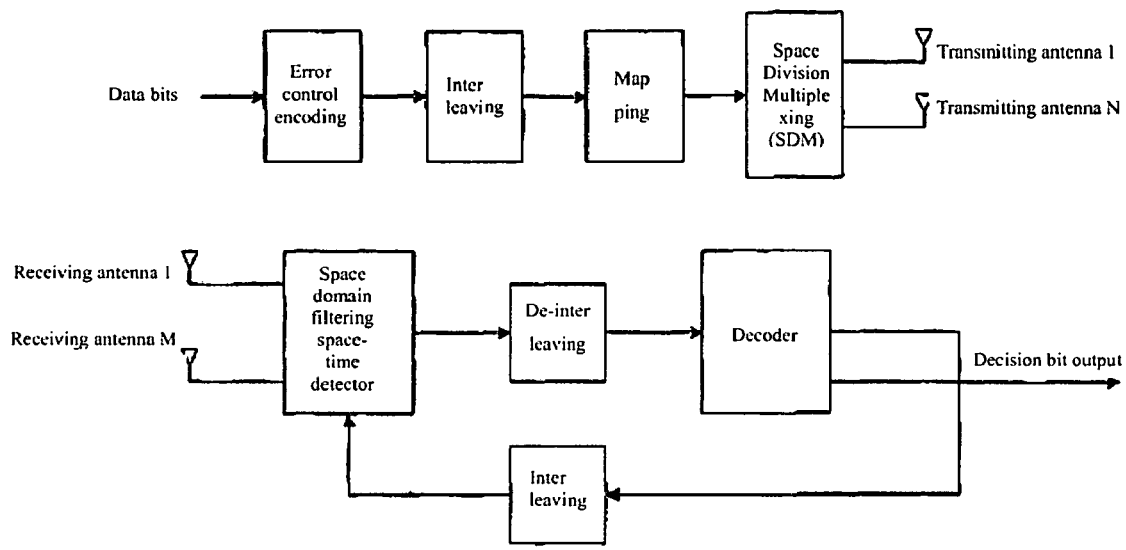
FIG. 1 are schematic diagrams of an encoding multi-antenna communication system and an iterative receiver for space domain filtering detection.
Figure 2:
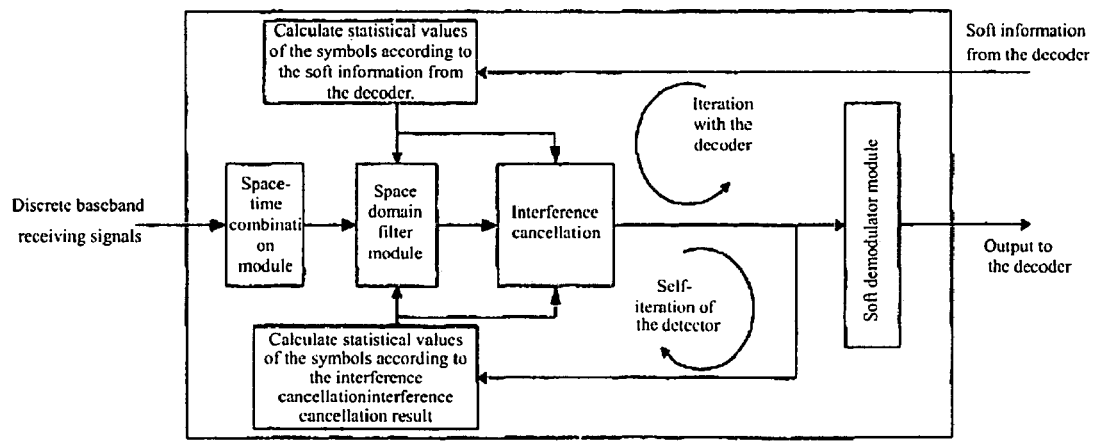
FIG. 2 is a schematic diagram of a soft I/O space domain filtering detector.

The method treats interference in time domain and interference in space domain differently, i.e., the method performs MF-based interference cancellation for the interference signals on all antennae in other moments, but performs filtering for the interference signals on other antennae in current time on the basis of specific criteria, as follows:

Step 1: performing matched combination for the received signals in time domain and space domain;
Step 2: taking the combined signals as observation values of the signals to be detected, and performing filtering in space domain on the basis of corresponding criteria;
Step 3: Removing the estimated values of interference signals from the filtered signals and then taking the result as detection output, and sending the output to a decider unit in an encoding system without error control to obtain hard-decision output of symbols, or sending the output to a soft demodulator in an error control encoding system to obtain soft information of the transmitted bits, and then sending the hard-decision output or soft information to a decoder.

The space domain filtering is on the basis of Minimum Mean Square Error (MMSE) criterion or zero forcing (ZF) criterion.

The filter coefficient is calculated according to the expectation and variance of the interference signals during space domain filtering.

The expectation and variance of interference signals are obtained from the result of the last detection, i.e., the detector performs self-iteration; the statistical information of interference signals is provided by the output of the decoder, i.e., the detector works with the decoder in an iterative mode.

The space domain filtering and space-time combined soft I/O detector is characterized in high performance and low complexity. The implementation is as follows:

1) Determine the system parameters, such as the number of transmitting antennae, number of receiving antennae, number of multi-paths of channel, and whether error control encoding is used or not, etc. In this embodiment, the number of transmitting antennae is 4, the number of receiving antennae is 4, the number of multi-paths of channel is 6, and the error control encoding mode is Turbo coding with code rate ½.

2) Determine the number of iterations of the detector according to the requirement of the receiving end for complexity and performance, if the detector is an iterative, the number of iterations between the detector and the decoder must be determined further. In this embodiment, the number of iterations of the detector during initial detection decoding is 4; the number of iterations between the detector and the decoder is 3.

3) If the system is an encoding system without error control, the detection will be carried out through the detection process described in algorithm 6.A. In an error control encoding system, if the receiving end employs a receiver in which the detection and decoding are separated from each other, the detection will be carried out through steps 6.B.1~6.B.5; if the receiving end employs an iterative detection decoding method, the detection will be carried out through the process described in algorithm 6.B. In this embodiment, an iterative detection decoding method is used, the detector is designed according to the technical scheme 1-4, and the implementation is as follows:

For each sub-block, i.e., a time period in which the channel coefficient is presumed as constant, suppose the length of the sub-block is K, the detector will work through the following process:

1) Carrying out space-time combination with expressions [1] and [2].
2) Initializing the expectation and variance of the signals, in the normalized case, the average value is 0, and the variance is 1.
3) Carrying out four times inster-iteration in the detector (initial detection).
  3.1) Carrying out space domain filtering with expressions [3] and [4].
  3.2) For each signal on each antenna, carrying out interference cancellation with expressions [5] and [6], and reconstructing the expectation and variance of the signal with expressions [7] and [8].
4) Calculating soft information of each bit with expression [11].
5) Carrying out general soft I/O decoding. If NOT:
6) Carrying out three times inter-iteration between the detector and the decoder (subsequent detection).
  6.1) Calculating expectation and variance of the signal with expressions [7], [9], and [11].
  6.2) Calculating space domain filter coefficient with expression 4 or setting the space domain filter matrix as C=I; carrying out space domain filtering with expression [3].
  6.3) Carrying out interference cancellation for each signal on each antenna with expressions [5] and [6], respectively.
  6.4) Calculating soft information of each bit with expression [11].
  6.5) Carrying out general soft I/O decoding.
7) Outputting the decoding result.

The invention claimed is:
1. A space domain filter detecting method in a multi-antenna wireless communication system, which treats interference in time domain and interference in space domain differently, the method comprising:
  Step 1: performing matched combination for a plurality of received signals in the time domain and the space domain to obtain combined signals;

Step 2: taking the combined signals as observation values of signals to be detected, and performing filtering in the space domain on the basis of corresponding criterions to obtain filtered signals;

Step 3: removing estimated values of interference signals from the filtered signals to obtain a detection output, and sending the detection output to a decider unit in an encoding system without error control to obtain a hard-decision output of symbols, or sending the detection output to a soft demodulator in an error control encoding system to obtain soft information of a plurality of transmitted bits, and then sending the hard-decision output of the symbols or the soft information of the plurality of transmitted bits to a decoder.

2. The space domain filter detecting method in a multi-antenna wireless communication system according to claim 1, wherein, the space domain filtering is on the basis of Minimum Mean Square Error (MMSE) criterion or Zero Forcing (ZF) criterion.

3. The space domain filter detecting method in a multi-antenna wireless communication system according to claim 1, wherein, the filtering in the space domain is performed with a filter coefficient calculated according to an expectation and a variance of the interference signals.

4. The space domain filter detecting method in a multi-antenna wireless communication system according to claim 3, wherein, the expectation and variance of the interference signals are obtained from the result of a last detection; and statistical information of the interference signals is provided by the output of the decoder.

* * * * *